(12) United States Patent
Pott

(10) Patent No.: US 11,274,584 B2
(45) Date of Patent: Mar. 15, 2022

(54) INDUCTIVELY HEATABLE CERAMIC BODY, METHOD FOR MANUFACTURING A CERAMIC BODY, EXHAUST GAS PURIFICATION DEVICE AND VEHICLE

(71) Applicant: VOLKSWAGEN AKTIENGESELLSCHAFT, Wolfsburg (DE)

(72) Inventor: Ekkehard Pott, Gifhorn (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 17/016,087

(22) Filed: Sep. 9, 2020

(65) Prior Publication Data

US 2021/0071560 A1 Mar. 11, 2021

(30) Foreign Application Priority Data

Sep. 10, 2019 (DE) ..................... 10 2019 124 239.8

(51) Int. Cl.
*F01N 3/022* (2006.01)
*F01N 3/027* (2006.01)
(Continued)

(52) U.S. Cl.
CPC .......... *F01N 3/027* (2013.01); *F01N 3/2828* (2013.01); *F01N 3/2013* (2013.01); *F01N 3/2026* (2013.01);
(Continued)

(58) Field of Classification Search
CPC ...... F01N 3/027; F01N 3/2013; F01N 3/2026; F01N 3/2828; F01N 2330/06; F01N 2240/16
See application file for complete search history.

(56) References Cited

U.S. PATENT DOCUMENTS

| | | | |
|---|---|---|---|
| 8,529,842 B2* | 9/2013 | Bruck | B01J 35/04 422/174 |
| 2008/0176013 A1* | 7/2008 | Ohno | F01N 3/0215 428/34.1 |

(Continued)

FOREIGN PATENT DOCUMENTS

| | | |
|---|---|---|
| CN | 107288715 A | * 10/2017 |
| CN | 107427770 A | 12/2017 |

(Continued)

OTHER PUBLICATIONS

Search report for German Patent Application No. 10 2019 124 239.8, dated Apr. 22, 2020.
(Continued)

*Primary Examiner* — Jonathan R Matthias
(74) *Attorney, Agent, or Firm* — Pearl Cohen Zedek Latzer Baratz LLP

(57) ABSTRACT

The invention relates to a ceramic body which can be designed as a catalyst support and/or particulate filter and which has a plurality of channels and a plurality of elongate metal elements for inductive heating arranged in parallel with the channels, the elongate metal elements being arranged in the walls of the ceramic body. In this way, the free frontal area of the ceramic body is preferably reduced or is at least no more than 5%. The invention also relates to a method for producing the ceramic body, an exhaust gas purification device and a vehicle.

14 Claims, 4 Drawing Sheets

(51) Int. Cl.
*F01N 3/28* (2006.01)
*F01N 3/20* (2006.01)
(52) U.S. Cl.
CPC ...... *F01N 2240/16* (2013.01); *F01N 2330/06* (2013.01)

(56) References Cited

U.S. PATENT DOCUMENTS

| | | | |
|---|---|---|---|
| 2017/0022868 A1* | 1/2017 | Crawford | F01N 3/2828 |
| 2018/0306743 A1* | 10/2018 | Muramatsu | F01N 3/0222 |
| 2019/0160429 A1 | 5/2019 | Crawford et al. | |

FOREIGN PATENT DOCUMENTS

| | | | | |
|---|---|---|---|---|
| CN | 108223061 A | 6/2018 | | |
| CN | 108291885 A | 7/2018 | | |
| EP | 1452703 A1 | 9/2004 | | |
| EP | 3 027 315 B1 | 12/2018 | | |
| EP | 3 431 179 A1 | 1/2019 | | |
| KR | 20060104987 A | 10/2006 | | |
| WO | WO-9421900 A1 * | 9/1994 | ......... | B01D 46/2425 |

OTHER PUBLICATIONS

Search report for European Patent Application No. 20 19 5399, dated Apr. 12, 2020.
Office Action for Chinese Patent Application No. 202010948020.7 dated Dec. 9, 2021.

* cited by examiner

INDUCTIVELY HEATABLE CERAMIC BODY, METHOD FOR MANUFACTURING A CERAMIC BODY, EXHAUST GAS PURIFICATION DEVICE AND VEHICLE

CROSS REFERENCE TO RELATED APPLICATION

This application claims priority to German patent application No. 10 2019 124 239.8, filed Sep. 10, 2019, which is incorporated herein by reference in its entirety.

FIELD OF THE INVENTION

The invention relates to a ceramic body, a method for manufacturing a ceramic body, an exhaust gas purification device and a vehicle having an internal combustion engine.

BACKGROUND OF THE INVENTION

Exhaust gases from stoichiometrically operated internal combustion engines are usually purified catalytically in order to reduce hydrocarbons, nitrogen oxides and carbon monoxide, for example. In addition to these gaseous substances, soot is also produced during combustion, which can be reduced by the particulate filter located downstream of the internal combustion engine.

A particulate filter is usually based on a filter body which is provided with channels in the flow direction and which can be made of ceramic. The channels can be closed at alternate ends and the channel walls have a predetermined porosity. The alternating closure of the channels forces the exhaust gas flowing through the filter body to pass through the wall, as a result of which particles in the exhaust gas are filtered out of the exhaust gas. The channel walls can also be provided with a coating that contains a noble metal-containing catalyst material for additional exhaust gas treatment. The catalytically active coating is applied as a so-called washcoat.

In order to regenerate a particulate filter with a degree of soot load, the filter is brought to a defined temperature so that the accumulated soot burns to form carbon dioxide. High catalytic conversion rates also require certain operating temperatures. However, seeking to continuously reduce $CO_2$ emissions in vehicles results in less and less heat energy being available in the exhaust system, and measures must therefore be taken to deliberately control the temperature of components in the exhaust gas purification system of a vehicle. This is particularly relevant when an internal combustion engine is cold-started, in which case the catalytic converters and filters should be brought to operating temperature as quickly as possible.

In order to make it possible to bring a catalytic converter having a ceramic filter body to operating temperature quickly, EP 3 027 315 B1 and EP 3 431 179 A1 propose inserting separate metal bodies, which can be inductively heated by means of electromagnetic fields, into the passages of the filter body. However, this reduces the cross-sectional area of the channels through which gas can flow, meaning that the catalytic converter performance is reduced or has to be compensated for by enlarging the filter body.

SUMMARY OF THE INVENTION

The aim of the invention is therefore that of providing a ceramic body for a particulate filter and/or as a catalyst support, which body allows rapid heating and at the same time, compared with the prior art, makes it possible not to reduce the cross-sectional area through which gas can flow, which would impair the performance of the ceramic body.

The aim is achieved by a ceramic body, a manufacturing method for the ceramic body, an exhaust gas purification device comprising the ceramic body, and a vehicle having the features as recited in the independent claims.

Advantageous embodiments are characterized in the dependent claims.

According to the invention, a ceramic body is provided which has a plurality of channels arranged in parallel and a plurality of elongate metal elements for inductive heating arranged in parallel with the channels, the elongate metal elements being arranged in the walls of the ceramic body.

Such ceramic bodies without the embodiment according to the invention are known from the prior art as honeycomb or particulate filter ceramic bodies.

The ceramic body according to the invention can be designed as a catalyst support and/or particulate filter. The ceramic body can thus have a catalytically active coating.

The ceramic body according to the invention is advantageously suitable for ensuring rapid heating to the operating temperature of an exhaust gas purification system, and also for providing the required temperature e.g. for regeneration in the embodiment as a particulate filter.

The metal elements used in the ceramic body according to the invention are ferromagnetic so as to be suitable for inductive heating.

The metal elements are preferably inserted in the walls so as to be spaced apart from one another in order to bring about as uniform a heat input as possible and to achieve the highest possible degree of coverage of the surface of the metal elements with ceramic.

That being said, the metal elements can be inserted in a higher density in certain regions of the ceramic body in order to compensate for design-related differences in the heating behavior of the ceramic body during operation.

In order to take into account different heating behavior of the ceramic body, metal elements with different thicknesses can alternatively be arranged in the ceramic body.

Wire portions are preferably used as elongate metal elements. These are particularly economical in the form of "endless" material in the manufacturing process.

The metal elements preferably have a diameter of 0.2-1.0 mm, particularly preferably of 0.4-0.6 mm, with a round cross section being preferred for economic reasons. However, other metal element cross sections also fulfill the same technical purpose.

The surface of the metal elements can be smooth or rough, depending on the specific requirements of the particular ceramic body.

The elongate metal elements preferably do not extend as far as the end faces of the ceramic body and are therefore not exposed.

The lengths of the individual metal elements preferably correspond to 0.8 to 0.95 times the length of the ceramic support, it being possible for several shorter metal elements to "add up" to one metal element with the aforementioned length. The shorter metal elements are preferably 0.1 to 0.999 times the length of the ceramic support.

The channels preferably have rectangular, preferably square or hexagonal (honeycomb) cross sections, with the inner corners preferably being rounded. The radii of curvature of the four corners can be different, for example to partially increase the wall thickness of the ceramic body in order to provide metal elements in these regions.

In principle, the metal parts can be arranged in the walls of the ceramic body in all regions, that is to say between channels and at the intersection points of the channels and the walls which form the outside of the ceramic body.

The exact distribution of the metal elements in the ceramic body is implemented by a person skilled in the art on the basis of the specific requirements for the particular ceramic body as a catalyst support or particulate filter.

The metal elements are preferably provided in the walls between at least two channels and particularly preferably in the region where the walls intersect, and are thus adjacent to four channels.

The walls of the ceramic body are preferably always made thicker in the region of the metal elements, since in this way the relatively thin ceramic material of the ceramic body advantageously does not crumble or crack when subjected to mechanical stress.

For the same reason, the metal elements are embedded in the ceramic body in such a way that they are completely surrounded by the ceramic of the ceramic body. This also results in relatively even heating of the ceramic.

Preferably more than 50%, more preferably 80%, even more preferably 90% and most preferably 99% of the surface of the metal elements is in contact with the surrounding ceramic of the ceramic body.

In order to avoid cracks forming, the coefficient of thermal expansion of the metal elements preferably deviates by less than 30%, more preferably by less than 20%, even more preferably by 10% and most preferably by less than 5% from that of the surrounding ceramic of the ceramic body.

Due to the arrangement of the metal elements in the walls of the ceramic body according to the invention, the free frontal area of the channels is preferably not reduced in comparison with a ceramic body according to the prior art that does not have inserted metal elements. The free frontal area should be understood to mean the free cross-sectional area of the channels.

In various embodiments of the ceramic body according to the invention, there may be a reduction in the free frontal area due to the partial increase in the wall thickness, with this being carried out in such a way that said frontal area is reduced by less than 5%.

According to the invention, a production method for the ceramic body according to the invention is provided which comprises the extrusion of a base material of the ceramic body, the metal elements being embedded in the material during the extrusion. Wire is preferably used for the metal elements.

The following is claimed: an exhaust gas purification device having a ceramic body as described above and an electromagnetic field generator, which is preferably arranged adjacent to the ceramic body in order to inductively heat the metal elements.

The exhaust gas purification device preferably has a shield, which is designed such that only the metal elements of the ceramic body are heated by the generator.

The invention relates to a vehicle comprising an internal combustion engine with respect to which an exhaust gas purification device according to the invention or an exhaust gas purification system comprising a ceramic body according to the invention is arranged downstream.

Unless otherwise stated for an individual case, the various embodiments of the invention mentioned in this application can be advantageously combined with one another.

BRIEF DESCRIPTION OF THE DRAWINGS

The invention is explained below in embodiments with reference to the accompanying drawings, in which.

DETAILED DESCRIPTION OF THE INVENTION

Figure 1:
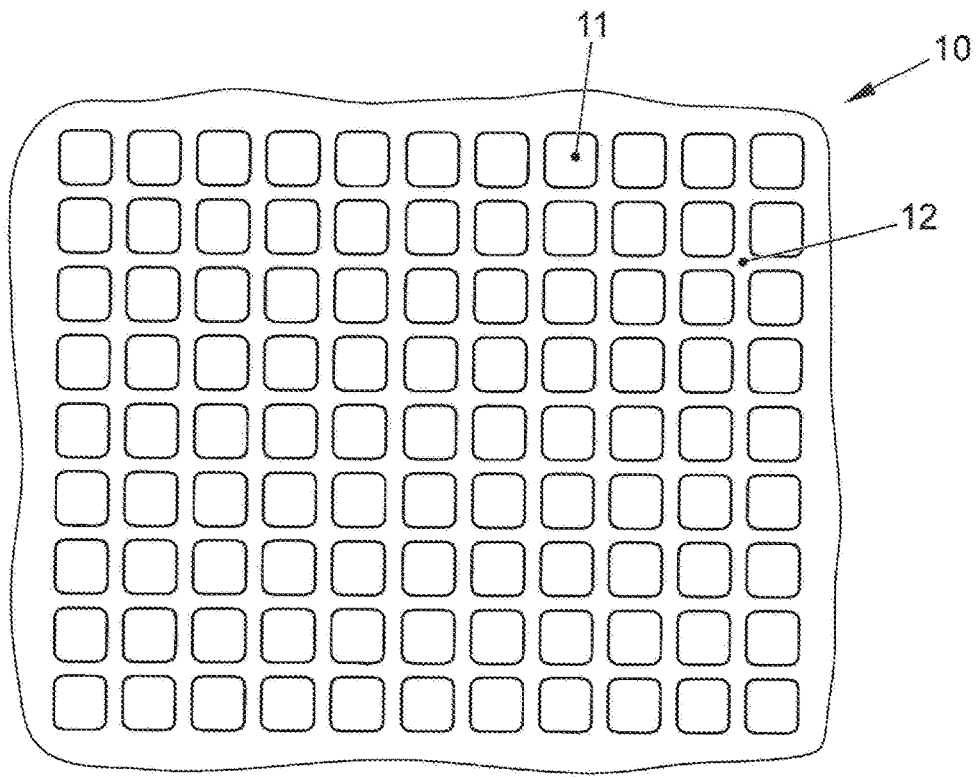
FIG. 1 is a sectional detail of a ceramic filter body according to the prior art.
Figure 2:
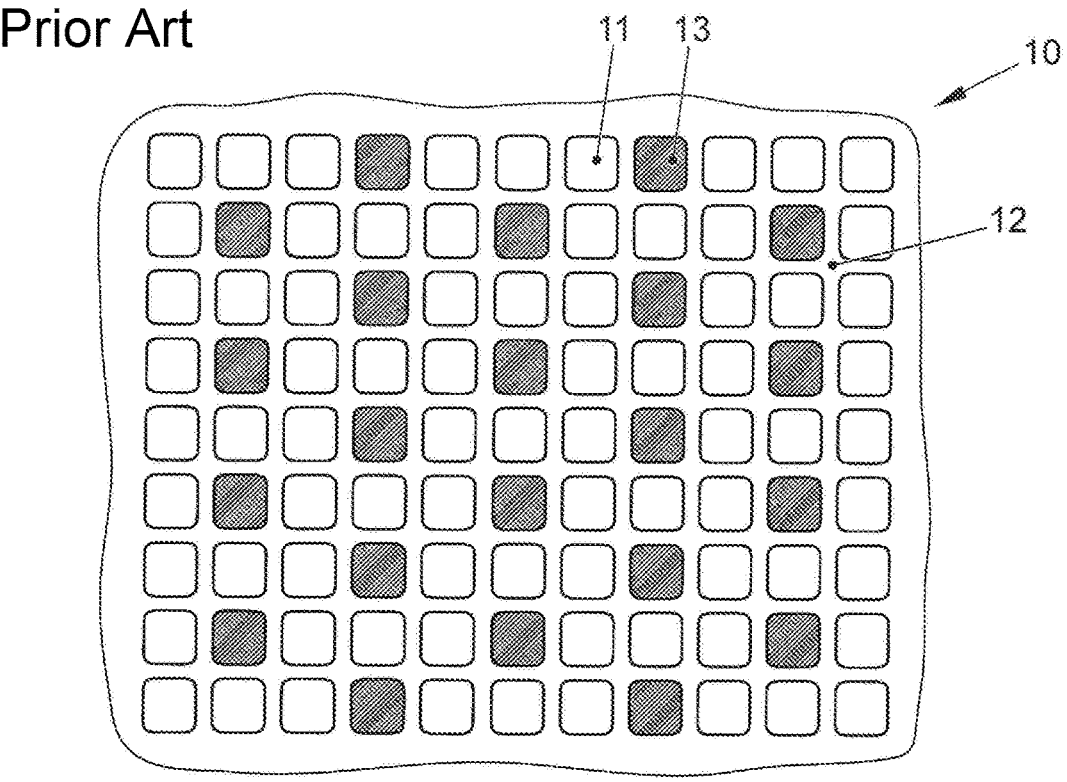
FIG. 2 is a sectional detail of a ceramic filter body with heating elements closing off some of the channels according to the prior art.

FIG. 1 shows a ceramic body 10 known from the prior art, which can be used as a catalyst support and/or particulate filter. The ceramic body 10 has a plurality of channels 11, which can be seen in the sectional view and through which the exhaust gases of an internal combustion engine are generally guided, said gases being catalytically purified and/or separated from particles. These channels 11 are usually arranged regularly and pass through the ceramic body 10 completely. The channels 11 are delimited by walls 12 made of the ceramic material of the ceramic body. In order to be able to bring the ceramic body 10 to a predetermined temperature for various purposes, metal bodies 13 can be inserted into individual channels 11, as shown in FIG. 2, which bodies can be heated by induction by means of a device not shown here. However, this reduces the free frontal area of the ceramic body 10 for the transport of the exhaust gases, so the ceramic body 10 has to be designed to be larger when using heating of this kind. This is disadvantageous because the installation space available in vehicle construction is very limited.

A ceramic body 10 according to the invention is shown in the details seen in FIGS. 3 to 7, in which lines for illustrating a section have been dispensed with for the sake of simplicity.

Figure 3:
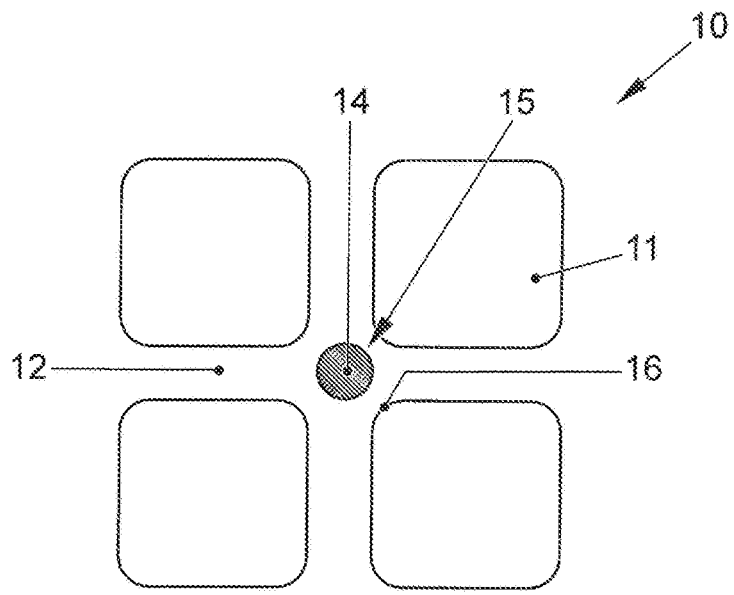
FIG. 3 is a sectional, schematic detail of four channels of a filter body according to the invention.
Figure 4:
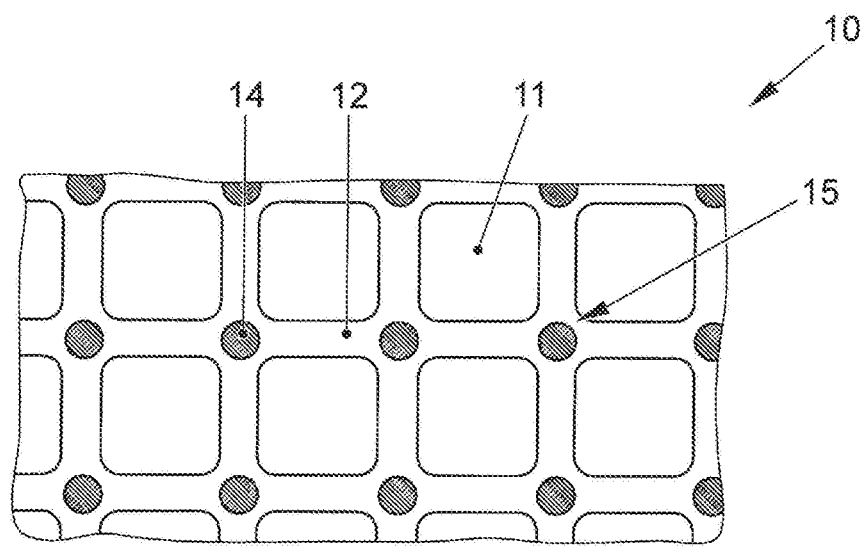
FIG. 4 is a sectional, schematic detail of a plurality of channels of a filter body according to the invention according to the embodiment shown in FIG. 3.

A first embodiment of the ceramic body 10 according to the invention is shown in FIG. 3, in which there are four channels 11 which are spaced apart from one another by walls 12. An elongate metal element 14, of which only the end face is visible, is provided at the intersection point 15 of the walls 12. This embodiment can also be seen in FIG. 4, which shows a plurality of channels 11 and metal elements 14. The metal elements 14 are provided regularly at all intersection points 15 of the walls 12, so that the whole of the ceramic body 10 is heated. In order to heat a ceramic body 10 unevenly because this is called for by the specific requirements of an exhaust gas purification system, any desired distribution pattern of the metal elements is conceivable. The density of the metal elements 14 used can also be varied in the case of even heating. Since the metal elements 14 according to the invention can be provided in the walls 12 that run between two channels 11 or in the walls that delimit the ceramic body 10, various distribution patterns of the metal elements 14 in the ceramic body 10 can be implemented.

Figure 5:
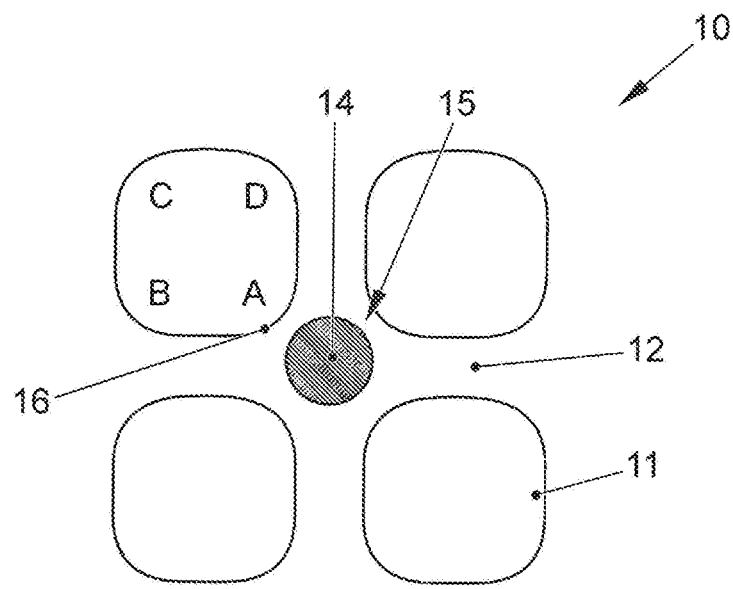
FIG. 5 is a sectional, schematic detail of four channels of a filter body according to the invention according to a second embodiment.
Figure 6:
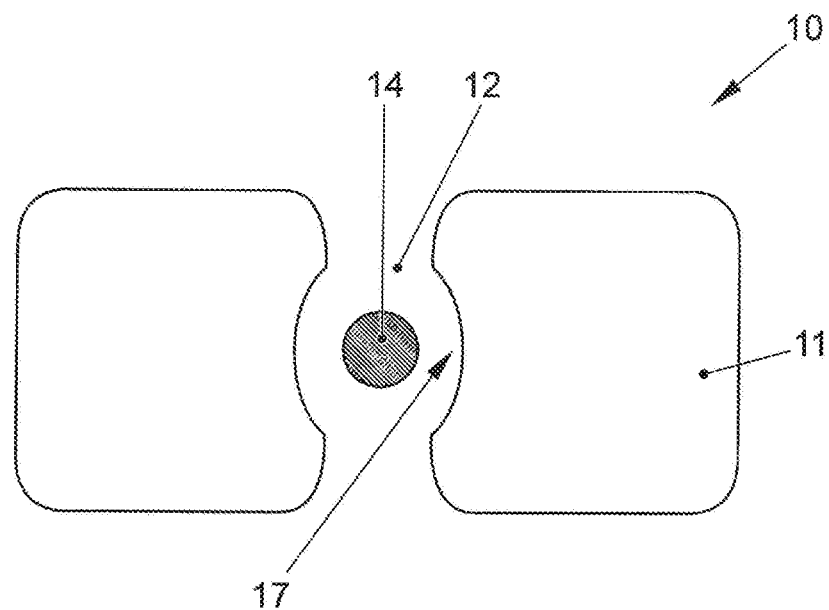
FIG. 6 is a sectional, schematic detail of two channels of a filter body according to the invention according to a third embodiment.

FIG. 5 corresponds to what is shown in FIG. 3, with the difference that the channels 11 have corners 16 with a larger radius of curvature A, B, C, D, and the metal element 14 shown can therefore have a larger diameter in order to achieve different heating behavior. Due to the larger radius of curvature A, B, C, D, the wall thickness of the wall 12 remains the same or approximately the same, such that the mechanical stability of the walls 12 is retained in comparison with the aforementioned embodiments. The radii of curvature A, B, C, D can also be designed differently depending on the presence of a metal element 14 adjacent to the relevant corner 16.

In order to ensure a certain wall thickness and corresponding mechanical properties when arranging a metal element 14 in the wall 12 between two channels 11 (FIG. 6) without reducing the cross-sectional area of the adjacent channels 11, the wall 12 can be thickened in the region surrounding the metal element 14 such that the corresponding channel 11 has a circular-segment shaped indentation 17 adjacent to the metal element 14. The radius of this indentation 17 is variable, but too large a radius results in a disadvantageous reduction in the free cross-sectional area of the channel 11. The minimum corresponds to the radius of the metal element 14.

Figure 7:
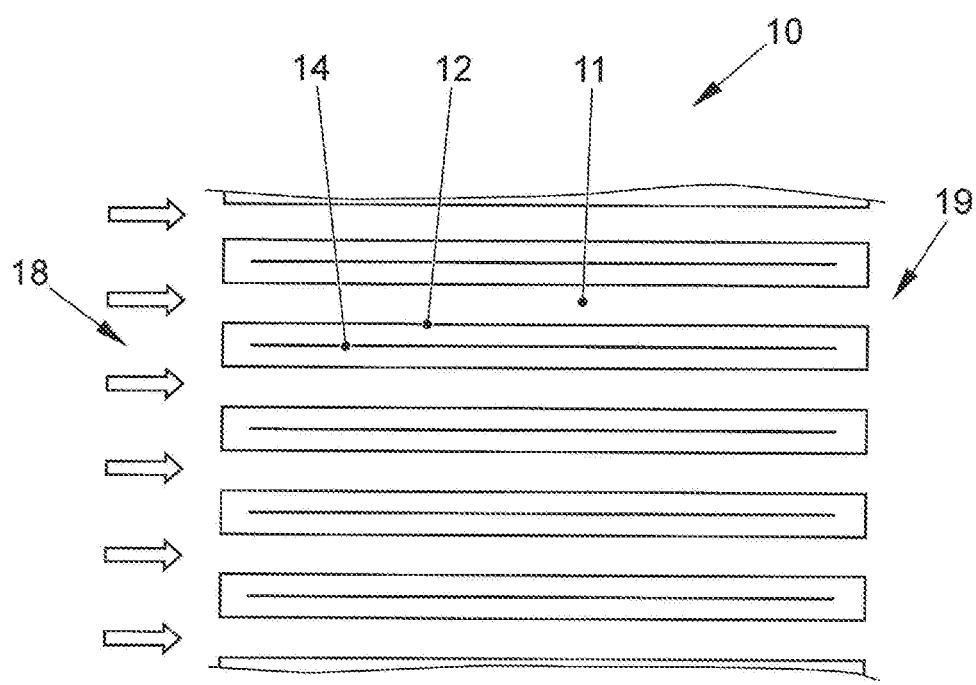
FIG. 7 is a longitudinally sectional, schematic detail of a ceramic filter body.

FIG. 7 is a longitudinal section of a ceramic body 10 according to the invention, which bifurcates the length of the channels 11. Exhaust gas (denoted by arrows) enters the channels 11 on an inlet side 18 of the ceramic body 10 and leaves said channels on the opposite outlet side 19. The exhaust gas is purified during transport. The metal elements 14 are embedded in the walls 12 which separate the channels 11 from one another. In this embodiment of the ceramic body 100, the metal elements 14 have covered end faces in order to avoid stress due to different coefficients of thermal expansion. Depending on the manufacturing process and design of the ceramic body 10, they can also be exposed.

LIST OF REFERENCE NUMERALS

10 ceramic body
11 channel
12 wall
13 metal body
14 metal element
15 intersection point
16 corner
17 indentation
18 inlet side
19 outlet side
A, B, C, D radius of curvature

The invention claimed is:

1. A ceramic body, comprising:
a plurality of channels arranged in parallel,
a plurality of elongate metal elements for inductive heating arranged in parallel with the channels, and
an indentation in the channels adjacent to the metal element in order to reinforce the wall region,
wherein the elongate metal elements are arranged in walls of the ceramic body, and
wherein a frontal area of the ceramic body which is blocked by the metal elements being embedded is no more than 5%.

2. The ceramic body according to claim 1, wherein the metal elements are embedded in the walls so as to be adjacent to a channel and/or between two channels and/or four channels.

3. The ceramic body according to claim 1, wherein more than 50%, of the surface of the metal elements is in contact with the surrounding ceramic.

4. The ceramic body according to claim 1, wherein the coefficient of thermal expansion of the metal elements deviates from that of the surrounding ceramic by less than 30%.

5. The ceramic body according to claim 1, wherein the metal elements have a diameter of 0.2-1.0 mm.

6. The ceramic body according to claim 1, wherein the lengths of the individual metal elements correspond to 0.8 to 0.95 times the length of the ceramic support, and wherein several shorter metal elements are added together to form one metal element.

7. The ceramic body according to claim 1, wherein a radius of curvature of a corner of the channel or channels, which corner is adjacent to the metal element, is enlarged compared with other corners of the channels in order to reinforce the wall region.

8. The ceramic body according to claim 1, wherein the walls of the ceramic body have a greater thickness in the region of metal elements than in other regions of the wall.

9. The ceramic body according to claim 1, wherein a diameter of the metal elements or the density of the metal elements provided are different depending on the position in the ceramic body.

10. An exhaust gas purification device, comprising a ceramic body according to claim 1 and a generator for electromagnetic fields, designed for inductively heating the metal elements.

11. The exhaust gas purification device according to claim 10, further comprising a shield which is designed such that only the metal elements are inductively heated by the generator.

12. A vehicle, comprising an internal combustion engine, with respect to which an exhaust gas purification device according to claim 10 is arranged downstream.

13. A vehicle, comprising an internal combustion engine, with respect to which an exhaust gas purification system having a ceramic body according to claim 1 is arranged downstream.

14. A method for manufacturing a ceramic body comprising a plurality of channels arranged in parallel, a plurality of elongate metal elements for inductive heating arranged in parallel with the channels, and an indentation in the channels adjacent to the metal element in order to reinforce the wall region, wherein the elongate metal elements are arranged in walls of the ceramic body, and wherein a frontal area of the ceramic body which is blocked by the metal elements being embedded is no more than 5%, said method comprising:
extruding a base material of the ceramic body, and
embedding the metal elements in the base material during the extrusion.

* * * * *